(12) United States Patent
Kamphenkel et al.

(10) Patent No.: US 9,026,722 B2
(45) Date of Patent: May 5, 2015

(54) STORING/READING SEVERAL DATA STREAMS INTO/FROM AN ARRAY OF MEMORIES

(75) Inventors: Oliver Kamphenkel, Lehrte (DE); Thomas Brune, Hannover (DE); Michael Drexler, Gehrden (DE); Stefan Abeling, Schwarmstedt (DE)

(73) Assignee: Thomson Licensing, Issy les Moulineaux (FR)

( * ) Notice: Subject to any disclaimer, the term of this patent is extended or adjusted under 35 U.S.C. 154(b) by 153 days.

(21) Appl. No.: 13/816,250

(22) PCT Filed: Aug. 8, 2011

(86) PCT No.: PCT/EP2011/063619
§ 371 (c)(1),
(2), (4) Date: Feb. 11, 2013

(87) PCT Pub. No.: WO2012/019997
PCT Pub. Date: Feb. 16, 2012

(65) Prior Publication Data
US 2013/0138875 A1 May 30, 2013

(30) Foreign Application Priority Data

Aug. 13, 2010 (EP) .................................. 10305890

(51) Int. Cl.
*G06F 12/00* (2006.01)
*G06F 12/02* (2006.01)
*G06F 13/16* (2006.01)

(52) U.S. Cl.
CPC ........ *G06F 12/0246* (2013.01); *G06F 13/1684* (2013.01); *G06F 2212/7202* (2013.01); *G06F 2212/7203* (2013.01); *G06F 2212/7208* (2013.01)

(58) Field of Classification Search
CPC .............................................. G06F 2212/7203
USPC ....................................................... 711/103
See application file for complete search history.

(56) References Cited

U.S. PATENT DOCUMENTS 6,226,708 B1 * 5/2001 McGoldrick et al. ......... 711/103
(Continued)

FOREIGN PATENT DOCUMENTS

WO         WO0246929          6/2002

OTHER PUBLICATIONS

Seong, Yoon Jae etal: "Hydra: A Block-Mapped Parallel Flash Memory Solid-State Disk Architecture" IEEE Transactions, vol 59, No. 7, Jul. 2010, pp. 905-921.
(Continued)

*Primary Examiner* — Larry Mackall
(74) *Attorney, Agent, or Firm* — International IP Law Group, PLLC

(57) ABSTRACT

High speed mass storage devices using NAND flash memories (MDY.X) are suitable for recording and playing back a video data stream under real-time conditions, wherein the data are handled page-wise in the flash memories and are written in parallel to multiple memory buses (MBy). However, for operating with multiple independent data streams a significant buffer size is required. According to the invention, data from different data streams are collected in corresponding different buffers (FIFO 1, . . . , FIFO Z) until the amount of collected data in a current buffer corresponds to a current one of the data blocks. Then, the data of the current data block from the current buffer are stored into memories connected to a current one of the memory buses, wherein the following buffered data block of the related data stream is later on stored into memories connected to a following one of the memory buses, the number of the following memory bus being increased with respect to the number of the current memory bus. These steps are repeated, also for the other ones of the data streams using other available ones of the buffers and other ones of the memory buses. In combination with a corresponding buffer control it is possible to allocate and use a minimum number of buffers in a flexible way.

8 Claims, 3 Drawing Sheets

(56) References Cited

U.S. PATENT DOCUMENTS

Figure 1:
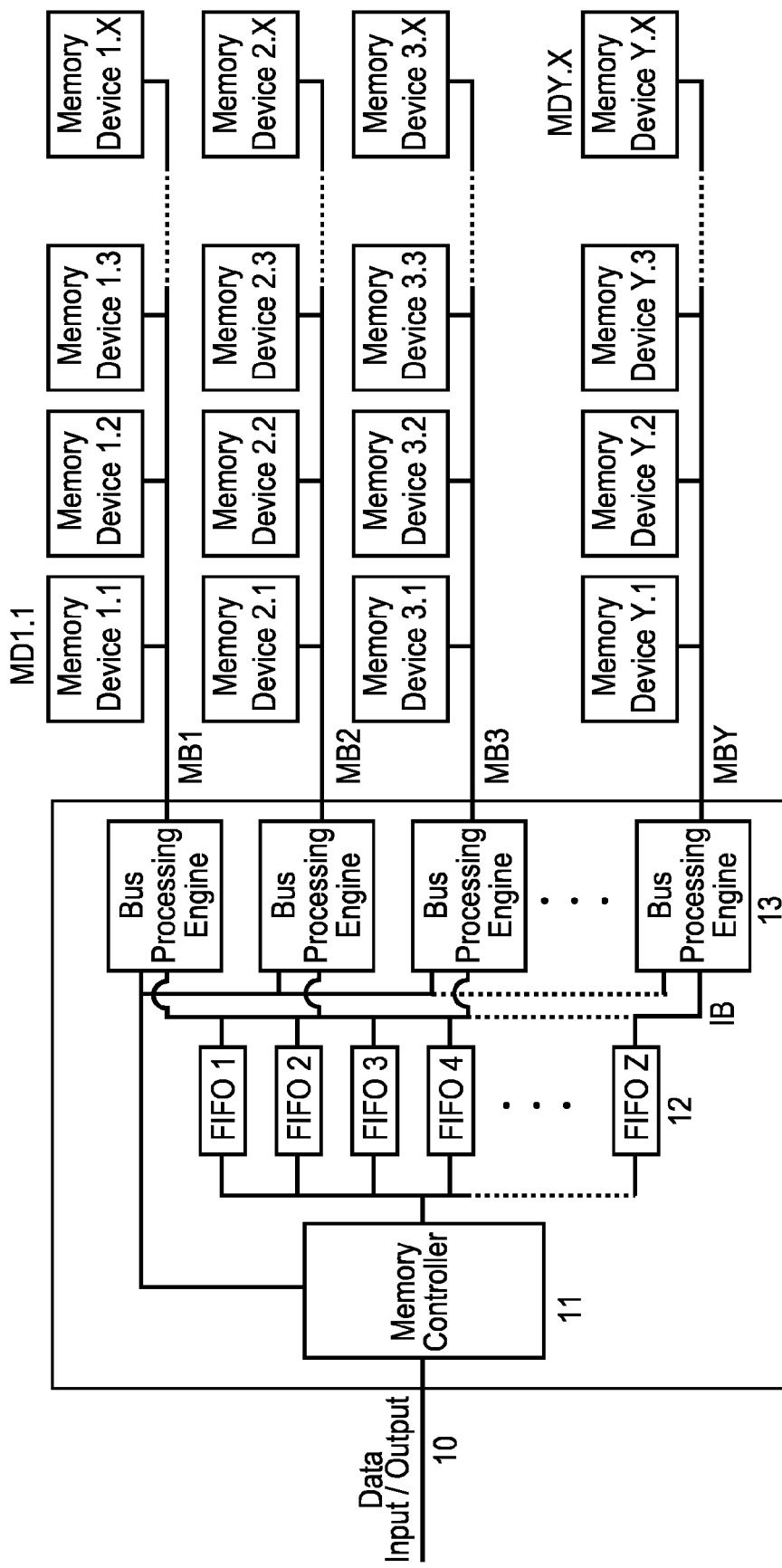

| | | |
|---|---|---|
| 2002/0124129 A1 | 9/2002 | Zilberman |
| 2003/0028704 A1 | 2/2003 | Mukaida et al. |
| 2004/0193782 A1* | 9/2004 | Bordui .................. 711/103 |
| 2005/0010717 A1 | 1/2005 | Ng et al. |
| 2005/0251617 A1 | 11/2005 | Sinclair et al. |
| 2007/0038808 A1* | 2/2007 | Yim et al. ................ 711/120 |
| 2007/0233939 A1 | 10/2007 | Kim |
| 2007/0288687 A1 | 12/2007 | Panabaker |
| 2008/0034153 A1 | 2/2008 | Lee et al. |
| 2008/0133822 A1 | 6/2008 | Saxe |
| 2010/0088463 A1 | 4/2010 | Im et al. |
| 2010/0318689 A1* | 12/2010 | Brune et al. .................. 710/27 |

OTHER PUBLICATIONS

Kim, Jae-Hong et al: "A methodology for extracting performance parameters in solid state disks (SSDs)", Mascots '09, Sep. 21, 2009, IDDD, pp. 1-10.

Search Report dated Sep. 7, 2011.

* cited by examiner

STORING/READING SEVERAL DATA STREAMS INTO/FROM AN ARRAY OF MEMORIES

This application claims the benefit, under 35 U.S.C. §365 of International Application PCT/EP2011/063619, filed Aug. 8, 2011, which was published in accordance with PCT Article 21(2) on Feb. 16, 2012 in English and which claims the benefit of European patent application No. 10305890.5, filed Aug. 13, 2010.

The invention relates to a method and to an apparatus for storing at least two data streams into an array of memories, or for reading at least two data streams from an array of memories, wherein the array is arranged such that the memories are accessed via multiple data or memory buses to each of which multiple memories are connected, and wherein only blocks of data can be programmed in, or read from, a memory at a time.

BACKGROUND

High speed mass storage devices built with non-volatile memory chips are suitable for recording and playing back concurrent data/video streams under real-time conditions, e.g. for video productions in film and broadcast studio environments. Higher spatial resolutions, higher frame rates and uncompressed multiple stream recording for 3D productions are increasing the requirements for storage media bandwidth and processing power capabilities. Since some years non-volatile memories like NAND flash devices are used for recording digital video. To fulfil the special storage requirements of digital video production with off-the-shelf NAND flash devices in mobile embedded storage media, a special handling of data and of NAND flash memories is required.

Writing data to state-of-the-art NAND flash memories requires a special processing of data flow caused by the internal architecture of NAND flash memories. Such non-volatile memory devices are organised as an array of programmable and readable memory pages, comprising data blocks of some kilobytes size. If data are to be written into a NAND flash memory device, it is necessary to program a full page of some kilobytes size (PAGESIZE). Additionally, the flash device needs a non-negligible processing time for writing such page into its internal memory array. During this programming time no other read/write commands can be executed on that flash device. Therefore the memory bus resources connecting the flash device with its controller will be unused during most of the time. To optimise utilisation of memory bus resources, it is known to connect multiple NAND flash devices to the same address/memory bus and to use them in an interleaved manner: the flash devices are processed one after the other, and while the first device is busy following a programming command, the memory bus resources are used to handle the other devices sharing the same memory bus. Manufacturers of NAND flash devices are supporting such kind of processing by integrating multiple dies of a flash device in one integrated circuit (IC), sharing a common external memory bus. Therefore such interleaved processing is feasible on a single IC. Depending on the time required for the programming/reading operations, it is possible to choose the number of interleaved devices in such a way that the bandwidth of the controlling memory bus is used in an optimum manner. For example, current NAND flash devices may have an 8-bit memory bus as external interface that can be driven with a speed of 40 MHz. The memory bus resource has a full bandwidth of approximately 40 MB/s, but the NAND flash device is written by programming operations of 2 KB pages that may last up to 600 µs. This will result in a sustained bandwidth of approximately 3.2 MB/s. In order to use the full 40 MB/s bandwidth of the memory bus resource, it would be necessary to connect 12 NAND flash devices to the memory bus and to use them in an interleaved manner.

To provide bandwidths higher than one memory bus can handle, data are written in parallel to multiple memory buses, whereby multiple flash pages on different flash devices are programmed concurrently. A corresponding structure of flash memories is shown in FIG. 1. A known controller 15 passes input data 10 to, or output data 10 from, Y parallel memory buses MB1 to MBY, to each of which X flash memory devices MDy.1 to MDy.X are connected. However, the internal structure shown within controller 15 does not show the prior art but is explained below in connection with the invention.

This kind of flash memory arrangement has the advantage that almost unlimited bandwidths can be provided for flash storage media. But increasing bandwidth leads also to an increasing amount of data that need to be written coherently. Only after a block of Y*PAGESIZE of data is available, these data can be programmed to the corresponding NAND flash memory devices on all Y parallel memory buses. To guarantee a specific minimum read or write bandwidth for input/output data 10, it is necessary to read/write the data in an interleaved manner as mentioned above. That implies the need to read/write sequential blocks of a size X*Y*PAGESIZE.

INVENTION

When accessing only a single data stream or file, there is no problem in ensuring a sequential read/write or recording and playback, respectively. But in case multiple concurrent data streams are to be written to, or read from, the NAND flash array, some effort is required to comply with these conditions.

One solution could be to buffer data of each data stream in an independent buffer, and to write data of the different streams consecutively to the flash memory array only after one buffer contains an amount of Y*PAGESIZE data. However, such processing would scramble the memory pages of different data streams into sequential 'interleaved blocks', whereby the interleaving is guaranteed when the data streams are written to and read from the flash memory array concurrently. But in case a single data stream only shall be read from the flash array, the interleaving is not ensured. Additionally, consecutive flash pages in a NAND flash memory are coupled to 'Erase Blocks', and in case one separate data stream is to be erased it would be necessary to implement a wasteful procedure for preserving the data pages of the other data streams. For implementing a corresponding solution using double buffering processing, a buffer of size 2*Y*PAGESIZE*NUMBER_OF_STREAMS would be required.

To avoid scrambled data in the interleaved blocks and in the erasing blocks, it is necessary to handle the different data streams as independent data blocks in the flash array. For writing incoming data streams independently in the flash array while still fulfilling the interleaving requirements, the incoming data must be buffered until the buffer of one specific data stream has collected enough data for writing a full 'interleaving block' in the flash memory array. But that solution would require a large buffer size of 2*Y*X*PAGESIZE*NUMBER_OF_STREAMS.

A problem to be solved by the invention is to provide a high-speed real-time flash memory processing in which multiple incoming data streams can be concurrently written to, or read from, independent areas of a flash memory array using a minimum buffer size only, and wherein interleaving requirements are fulfilled for each stream independently. This problem is solved by the methods disclosed in claims 1 and 3. An apparatus that utilises this method is disclosed in claims 2 and 4.

According to the invention, the Y parallel memory buses are not used as strictly parallel memory buses, but as serial data lanes (i.e. memory buses). It is not necessary to buffer data until the amount of incoming data of one data stream will suffice writing corresponding data pages on all Y memory buses. Instead, data are written in the flash memory array as soon as one of the data streams has enough data buffered for writing a full 'interleaving block' on one memory bus. In combination with a smart buffer control it is possible to allocate and use a minimal number of small buffers in a flexible way. Data of the different data streams are also concurrently written to the memory buses of the flash memory array and, depending on the receiving time of the data, it is advantageously possible to handle storage, or replay, of the data streams in a more flexible and effective manner.

In principle, the inventive method is suited for storing or recording at least two data streams or files into an array of memories, wherein said array is arranged such that the memories are accessed via multiple memory buses to each of which multiple memories are connected, and wherein only blocks of data can be programmed in a memory at a time, said method including the steps:
a) collecting data from different ones of said data streams in corresponding different buffers until the amount of collected data for a current one of said data streams in a current buffer equals the size of a current one of said data blocks, wherein the number of buffers is different than the number of data streams;
b) storing the data of said current data block from that current buffer into a memory or memories connected to a current one of said memory buses, wherein the following buffered data block of the related data stream is later on stored into a memory or memories connected to a following one of said memory buses, the number of said following memory bus being increased or decreased, respectively, with respect to the number of the current memory bus;
c) repeatedly performing steps a) and b), also for the other ones of said data streams using other available ones of said buffers and other ones of said memory buses.

In principle the inventive apparatus is suited for storing or recording at least two data streams or files into an array of memories, wherein said array is arranged such that the memories are accessed via multiple memory buses to each of which multiple memories are connected, and wherein only blocks of data can be programmed in a memory at a time, said apparatus including:
means being adapted for collecting data from different ones of said data streams in corresponding different buffers until the amount of collected data for a current one of said data streams in a current buffer equals the size of a current one of said data blocks, wherein the number of buffers is different than the number of data streams;
means being adapted for storing the data of said current data block from that current buffer into a memory or memories connected to a current one of said memory buses, wherein the following buffered data block of the related data stream is later on stored into a memory or memories connected to a following one of said memory buses, the number of said following memory bus being increased or decreased, respectively, with respect to the number of the current memory bus,
wherein said collecting means and said storing means are operating repeatedly, also for the other ones of said data streams using other available ones of said buffers and other ones of said memory buses.

In principle, the inventive method is suited for reading or replaying at least two data streams or files from an array of memories, wherein said array is arranged such that the memories are accessed via multiple memory buses to each of which multiple memories are connected, and wherein only blocks of data can be read from a memory at a time, said method including the steps:
a) reading data of a current data block from a memory or memories connected to a current one of said memory buses and storing them into a current buffer, wherein the following data block of the related data stream is later on read from a memory or memories connected to a following one of said memory buses, the number of said following memory bus being increased or decreased, respectively, with respect to the number of the current memory bus;
b) assembling data of different ones of said data streams from corresponding different buffers, wherein the number of buffers is different than the number of data streams;
c) repeatedly performing steps a) and b), also for the other ones of said data streams using other available ones of said buffers and other ones of said memory buses.

In principle the inventive apparatus is suited for reading or replaying at least two data streams or files from an array of memories, wherein said array is arranged such that the memories are accessed via multiple memory buses to each of which multiple memories are connected, and wherein only blocks of data can be read from a memory at a time, said apparatus including:
means being adapted for reading data of a current data block from a memory or memories connected to a current one of said memory buses and for storing them into a current buffer, wherein the following data block of the related data stream is later on read from a memory or memories connected to a following one of said memory buses, the number of said following memory bus being increased or decreased, respectively, with respect to the number of the current memory bus;
means being adapted for assembling data of different ones of said data streams from corresponding different buffers, wherein the number of buffers is different than the number of data streams,
and wherein said reading means and said assembling means are operating repeatedly, also for the other ones of said data streams using other available ones of said buffers and other ones of said memory buses.

Advantageous additional embodiments of the invention are disclosed in the respective dependent claims.

DRAWINGS

Figure 2:
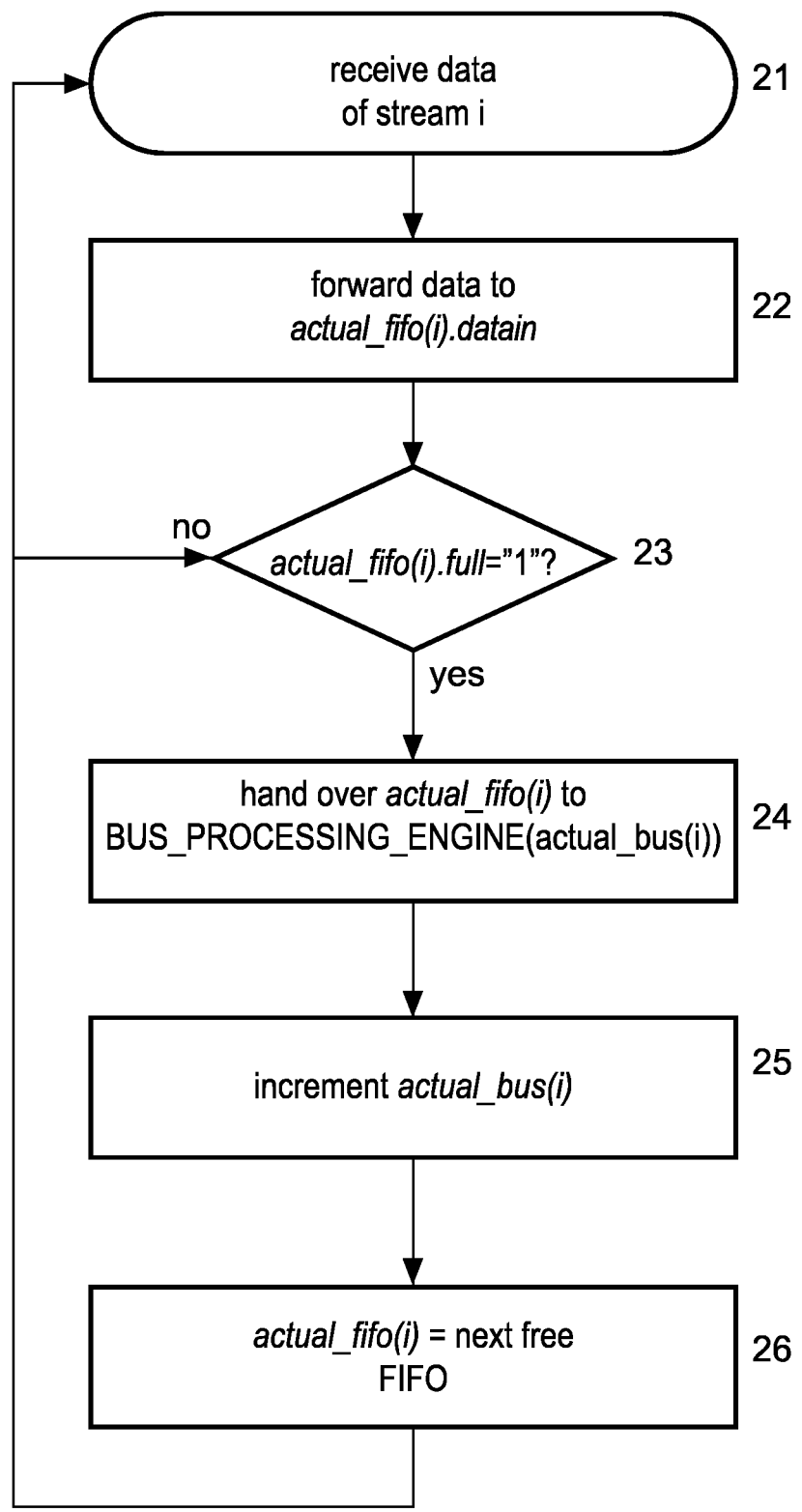
Figure 3:
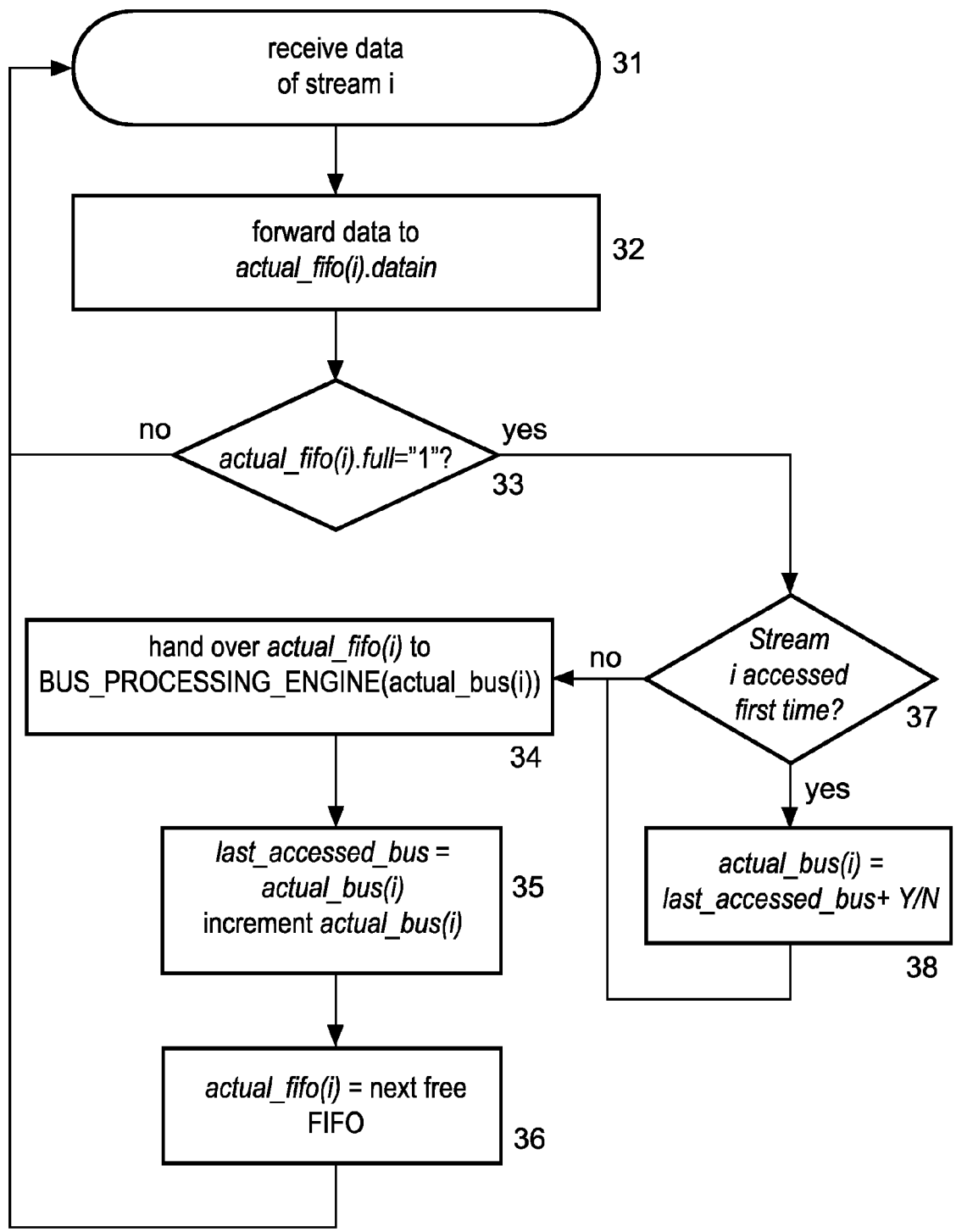

Exemplary embodiments of the invention are described with reference to the accompanying drawings, which show in:
FIG. 1 Inventive flash memory device;
FIG. 2 Flowchart of the memory control;
FIG. 3 Flowchart of the memory control for multiple data streams with equal data rates.

EXEMPLARY EMBODIMENTS

Accessing multiple data streams or files in the flash memory array requires as much flexibility for data block access as possible. For example, the format of the multiple data streams of the data input or output can conform the Ethernet protocol whereas the data for storage in, or read from, the memory array must be addressed according to a different protocol or format. To provide high-bandwidth access to a NAND flash memory array with a minimum of buffer resources and a maximum of flexibility in data stream access, the invention deviates from the known strictly parallel handling of memory buses. Instead, the parallel memory buses are regarded as representing serial memory buses (i.e. lanes) that are fed, or read, by concurrent memory bus processing engines. The known parallelism is broken with respect to temporal direction because the processing of the memory buses no more starts and ends at the same time instants. The known parallelism is also broken with respect to processing location because different memory buses can access different data streams in a different or flexible way.

Incoming data of different data streams, which data streams can have differing data rates, are buffered in an independent FIFO buffer for each data stream. As soon as the amount of buffered data of one data stream is beginning to exceed the size of one 'interleaving block' (X*PAGESIZE) on one memory bus, these already stored data are written at the actual position (i.e. the current position at which the data stream is to be written or its writing is to be continued) on the current memory bus for that data stream. Successive 'interleaving blocks' of that data stream are distributed in an ascending order (or, as an alternative embodiment, in descending order) to the Y memory buses, i.e. a first data block of a particular data stream is written to memory bus 1, the second data block to e.g. memory bus 2, the third data block to e.g. memory bus 3, . . . , the Yth data block to e.g. memory bus Y, and (Y+1)th data block again to memory bus 1, and so on. Thus, because of concurrent memory bus processing, a parallelism in processing on the memory buses for a given data stream is remaining in order to achieve the desired bandwidth for that data stream read/write access. Advantageously, such regular structure of memory bus accesses is minimising the demands on a file system that is required for arranging data streams/files on a recording storage medium. This procedure supports the parallelism of data streams because, depending on the current incoming data, different memory buses can access different data streams concurrently.

The inventive processing can be implemented in a device as shown in the block diagram of FIG. 1. A memory controller 11 passes input or output data 10 via Z FIFO buffer stages 12 (with running index z=1 to Z) and Y memory bus processing engines 13 to or from, respectively, Y parallel memory buses MB1 to MBY (with running index y=1 to Y) to each of which X flash memory devices MDy.1 to MDy.X are connected, representing a memory array of Y*X memories MD1.1 to MDY.X. The memory controller 11 receives streaming data 10 of up to N different data streams. For intermediately buffering the stream data, a number of Z buffers of size X*PAGESIZE are arranged between memory controller 11 and an internal memory bus MBy connecting the memory bus processing engines 13, wherein the number Z of buffers is different than the number N of data streams. Controller 11 forwards the incoming data from each stream to a different one of the buffers, wherein any buffer can be allocated to any stream. As soon as a buffer is full of data of one of the data streams, memory controller 11 assigns that buffer (and related storage information, like physical address etc.) to an appropriate memory bus processing engine 13 for memory bus MBy, followed by loading the data block into that memory bus processing engine, and allocates the next free buffer to that data stream.

The processing of the received stream data in memory controller 11 is shown in FIG. 2. For every received data stream i (step 21) a reference value $z_{current}$=actual_fifo(i) to its current buffer is provided by controller 11. The memory bus 'y' to which the next data of a stream i must be sent to is registered in value actual_bus(i). In step 22, the stream i data are forwarded to the actual buffer data input actual_fifo(i) .datain as long as a corresponding flag actual_fifo(i).full is not set (step 23). As soon as buffer actual_fifo(i) is full, the buffer data are passed in step 24 to memory bus processing engine actual_bus(i) and value actual_bus(i) is incremented to actual_bus(i+1) (or decremented to actual_bus(i−1) in a different embodiment) in step 25, in a circular manner among memory bus numbers MB1 to MBY. In step 26, value actual_fifo(i) is set to the number $z_{next}$ of the next free buffer among buffer numbers 1 to Z, and in step 21 the following data block of stream i is received by controller 11. The current memory bus processing engine 13 number actual_bus(i) programs data of buffer number actual_fifo(i) to the flash memory devices of the corresponding memory bus in the order the buffer data has arrived. For example, the data stored in the buffers can have a format or timing or order of sequence different than the format or timing or order of sequence required for storing the data in the memory array. The memory bus processing engine 13 also converts the incoming data format or timing or order of sequence into the data format required for output. After a memory bus processing engine has programmed stream data and has emptied a buffer, the control of that buffer is handed back to memory controller 11.

For such processing it is assumed that data of the different streams is received randomly and is written with separate regular structures into the memory array. To minimise the required buffer size X*PAGESIZE, the special properties of streaming data can be used. Given that the flash memory fabric is designed to achieve at least the write data rate of the sum of the data rates of the incoming data streams (whereby it is assumed that one memory bus can handle 1/Y of this data rate), one would need N*Y FIFO buffers for buffering the incoming data for N simultaneous streams and in addition N+1 FIFO buffers for bridging the time gap until the first buffer can be re-used. So, an amount of N*Y+N+1 buffers of size X*PAGESIZE is required, wherein N is the number of concurrent data streams, Y is the number of memory buses and X is the number of interleaved flash devices. That amount of buffers would be needed for processing the worst case: all data streams are to be written into the same memory buses concurrently. However, with the above described procedure it is additionally possible to reduce the number of buffers by the minimum number of freed buffers: as soon as the content of a buffer starts to be written into the flash memory devices, an amount of Y buffers is filled, until that buffer is freed. Assuming that an amount of N−1 buffers may need to wait (while another data stream is written) before their content can be written into the memory bus, an amount of $$\sum_{i=1}^{N-1} \text{round\_up}\left(\frac{i*Y}{N}\right)$$

freed buffers will result.

Therefore, when using the processing described above, a total amount of $$Z = (N*Y) + N + 1 - \sum_{i=1}^{N-1} \text{round\_up}\left(\frac{i*Y}{N}\right)$$

buffers of size X*PAGESIZE is required to guarantee availability of the full data rate under all conditions.

In a further embodiment, N data streams having equal data rates are recorded concurrently.

Each one of these data streams has a maximum data rate of Y/N*DATARATE_OF_ONE_FLASH_BUS. Advantageously it is possible to minimise the required number of buffers (i.e. FIFOs) to Y+N+1 when preventing that data streams are written concurrently into a single one of the memory buses. That is accomplished by starting the writing of the different data streams in every processing cycle on different memory buses. The processing described in connection with FIG. 2 is extended by a register storing the value last_accessed_bus that contains the number of the last memory bus into which stream signal data have been written. To start recording different streams on shifted memory buses, the following procedure could be used:

For every received data stream i (step 31) a reference value $z_{current}$=actual_fifo(i) to its current buffer is provided by controller 11. The memory bus to which the next data of a stream i must be sent to is registered in value actual_bus(i). In step 32, the stream i data are forwarded to the actual buffer data input actual_fifo(i).datain as long as a corresponding flag actual_fifo(i).full is not set (step 33). As soon as buffer actual_fifo(i) is full, it is checked in step 37 whether or not data stream i is accessed for the first time. If true, the value actual_bus(i) is set in step 38 to the sum of values last_accessed_bus and Y/N. The buffer data are passed in step 34 to memory bus processing engine actual_bus(i). In step 35 the value last_accessed_bus is set to the value actual_bus(i), and value actual_bus(i) is incremented to actual_bus(i+1) (or decremented to actual_bus(i−1) in a different embodiment), in a circular manner among memory bus numbers MB1 to MBY. In step 36, value actual_fifo(i) is set to the number $z_{next}$ of the next free buffer among buffer numbers 1 to Z, and in step 31 the following data block of stream i is received by controller 11.

For replay of the data stream or streams stored in memory devices MD1.1 to MDY.X, the corresponding inverse steps are carried out. Memory bus processing engine 13 number receives the desired data from memory bus actual_bus(i) and converts the incoming data format or timing or order of sequence into the data format required for output to the current buffer number actual_fifo(i). Besides controlling the memory bus processing engines and the buffers, controller 11 assembles the data output from the buffers to the data streams 10 in the desired format.

The invention facilitates read/write access for multiple data streams in real-time. An access faster than real-time to separate data streams is possible. It is still possible to read or replay the data streams with maximum bandwidth. It is still possible to delete data streams independently from each other.

The invention can be used in all block-based storage media that are organised in parallel data paths.

The invention claimed is:

1. A method for storing at least two data streams into an array of NAND flash memories, the method comprising:
   a) collecting data from different ones of the data streams in corresponding different buffers until an amount of collected data for a current one of the data streams in a current buffer equals a PAGESIZE of a current data block, wherein a number, Z, of buffers is different than a number, N, of the data streams, wherein the array is arranged such that the NAND flash memories are accessed via a number of Y memory buses, to each of which, a number of X memories are connected, and wherein only the current data block can be programmed in a memory at a time, wherein $$Z = (N*Y) + N + 1 - \sum_{i=1}^{N-1} \text{round\_up}\left(\frac{i*Y}{N}\right),$$

and wherein storage capacity of each of the buffers is at least X*PAGESIZE;
   b) storing the data of the current data block from the current buffer into at least one memory connected to a current one of the memory buses, wherein a following buffered data block of a related data stream is later stored into at least one memory connected to a following memory bus of the memory buses, a number of the following memory bus being increased or decreased, respectively, with respect to a number of the current memory bus;
   c) repeatedly performing a) and b), and for other ones of the data streams using other available ones of the buffers and other ones of the memory buses.

2. The method according to claim 1, wherein each one of the data streams has the same data rate and the writing of the different data streams is started in every processing cycle on different ones of the memory buses.

3. An apparatus for storing or recording at least two data streams or files into an array of NAND flash memories, the apparatus comprising:
   a memory controller collecting data from different ones of the data streams in corresponding different buffers until the amount of collected data for a current one of the data streams in a current buffer equals the size PAGESIZE of a current one of the data blocks, wherein a number Z of buffers is different than a number, N, of data streams, wherein the array is arranged such that the NAND flash memories are accessed via a number of Y memory buses, to each of which, a number of X memories are connected, and wherein only blocks of data can be programmed in a memory at a time, wherein $$Z = (N*Y) + N + 1 - \sum_{i=1}^{N-1} \text{round\_up}\left(\frac{i*Y}{N}\right),$$

and storage capacity of each buffer is at least X*PAGESIZE;
   a module storing the data of the current data block from the current buffer into a memory or memories connected to a current one of the memory buses, wherein a following buffered data block of a related data stream is later stored into a memory or memories connected to a following one of the memory buses, a number of the following one memory bus being increased or decreased, respectively, with respect to a number of the current one memory bus, wherein collecting and storing are operating repeatedly, also for other ones of the data streams using other available ones of the buffers and other ones of the memory buses.

4. The apparatus according to claim 3, wherein each one of the data streams has a same data rate and writing of different data streams is started in every processing cycle on different ones of the memory buses.

5. A method for reading or replaying at least two data streams or files from an array of NAND flash memories, the method comprising:
   a) reading data of a current data block of size PAGESIZE from a memory or memories connected to a current one of the memory buses and storing them into a current buffer, wherein a following data block of a related data stream is later on read from a memory or memories connected to a following one of the memory buses, the number of the following memory bus being increased or decreased, respectively, with respect to a number of the current memory bus, wherein the array is arranged such that the NAND flash memories are accessed via a number of Y memory buses, to each of which, a number of X memories are connected, and wherein only the current data block can be read from a memory at a time;
   b) assembling data of different ones of the data streams from corresponding different buffers, wherein a number, Z, of buffers is different than a number N of data streams, and wherein $$Z = (N*Y) + N + 1 - \sum_{i=1}^{N-1} \text{round\_up}\left(\frac{i*Y}{N}\right),$$

and storage capacity of each buffer is at least X*PAGESIZE;
c) repeatedly performing a) and b), also for other ones of the data streams using other available ones of the buffers and other ones of the memory buses.

6. The method according to claim 5, wherein each one of the data streams has the same data rate and the writing of the different data streams is started in every processing cycle on different ones of the memory buses.

7. An apparatus for reading or replaying at least two data streams or files from an array of NAND flash memories, the apparatus comprising:
a memory controller reading data of a current data block of size PAGESIZE from a memory or memories connected to a current one of the memory buses and for storing them into a current buffer, wherein a following data block of a related data stream is later on read from a memory or memories connected to a following one of the memory buses, the number of the following memory bus being increased or decreased, respectively, with respect to a number of the current memory bus, wherein the array is arranged such that the NAND flash memories are accessed via a number of Y memory buses to each of which a number of X memories are connected, and wherein only the current data block can be read from a memory at a time;
a memory controller assembling data of different ones of the data streams from corresponding different buffers, wherein a number, Z, of buffers is different than a number, N, of data streams, wherein $$Z = (N*Y) + N + 1 - \sum_{i=1}^{N-1} \text{round\_up}\left(\frac{i*Y}{N}\right),$$

and wherein storage capacity of each buffer is at least X*PAGESIZE, and wherein reading and assembling are operating repeatedly, also for other ones of the data streams using other available ones of the buffers and other ones of the memory buses.

8. The apparatus according to claim 7, wherein each one of the data streams has the same data rate and the writing of the different data streams is started in every processing cycle on different ones of the memory buses.

* * * * *